United States Patent [19] [11] 3,897,397
Russell et al. [45] July 29, 1975

[54] URETHANE COATING POWDER COMPOSITIONS

[75] Inventors: Donald H. Russell, Cherry Hill, N.J.; Kurt C. Frisch, Grosse Ile, Mich.

[73] Assignee: Atlantic Richfield Company, Philadelphia, Pa.

[22] Filed: Dec. 13, 1973

[21] Appl. No.: 424,487

[52] U.S. Cl............ 260/77.5 R; 260/13; 260/240 R; 260/244 R
[51] Int. Cl.$^2$........................................ C08G 18/00
[58] Field of Search............ 260/77.5 R, 13, 244 R, 260/240 R

[56] References Cited
UNITED STATES PATENTS
| | | | |
|---|---|---|---|
| 3,531,425 | 9/1970 | Burk et al. | 260/859 |
| 3,725,340 | 4/1973 | Erdmenger et al. | 260/77.5 AA |

Primary Examiner—M. J. Welsh
Attorney, Agent, or Firm—Coleman R. Reap

[57] ABSTRACT

A shelf-stable urethane-type polymer producing coating powder composition is presented comprised of a cyclic nitrile compound and, optionally, a reactive hydrogen-containing compound selected from the class consisting of polyols and polythiols and a condensation-rearrangement catalyst. The preferred cyclic nitrile compounds are the cyclic nitrile carbonates, for example, adipodi(nitrile carbonate), and the preferred reactive hydrogen-containing compounds are hydroxyl-containing polymers, for example, cellulose acetate butyrate. The coating powder composition may also be prepared from a prepolymer of the above compounds. The coating powder composition preferably has a particle size of about 50 to 250 microns.

22 Claims, No Drawings

URETHANE COATING POWDER COMPOSITIONS

BACKGROUND OF THE INVENTION

This invention relates to powder coating compositions and more particularly to a coating powder composition capable of holding a high static electric charge and which forms a durable polymeric film coating upon heating.

Since their introduction in the early 1950's, powdered coating compositions and techniques have become increasingly popular in the coating industry. This is due to the several advantages which this method offers over conventional solvent-type coating methods. Today there are many coating powder compositions available on the market both in the thermoplastic and thermoset polymer categories. In spite of the fact that it is well known that urethane film coatings have excellent physical properties, urethane powdered coating compositions are not, in general, available on the market. The principal reasons for the lack of availability of urethane powder coating compositions are that they are conventionally made of isocyanates and hydroxyl-containing compounds such as polyester or polyether polyols. The condensation reaction between these compounds is rapid, particularly in the presence of a catalyst, and, thus, they do not exhibit good storage stability even in the powdered form. Moreover, isocyanates have a great propensity to react with water so that great care would have to be taken to prevent a urethane powder coating material comprised of conventional isocyanates and polyols from coming into contact with moisture, even the moisture present in the air. Furthermore, the highly toxic nature of isocyanates has discouraged the general use of isocyanates in coating powder compositions. In spite of these drawbacks, there is a continuing need for coating powders having the excellent physical properties of polyurethane films.

SUMMARY OF THE INVENTION

It has now been discovered that urethane-type powder coating compositions not having the above disadvantages can be prepared from cyclic nitrile compounds. Films made from these compositions have all of the excellent physical and chemical properties exhibited by urethane films applied by solvent techniques. Cyclic nitrile compounds and urethane-type compositions produced from them are disclosed in U.S. Pat. Nos. 3,480,595; 3,531,425; 3,560,492; 3,652,507; and 3,702,320 and the disclosures of these patents are incorporated herein by reference.

Accordingly, it is an object of the invention to present a shelf-stable powder coating composition comprised of a cyclic nitrile compound.

It is another object of the invention to present a shelf-stable urethane-type producing coating composition in powder form containing a cyclic nitrile compound.

It is another object of the invention to present a relatively non-toxic urethane-producing powder coating composition.

It is another object of the invention to present a urethane-producing powder coating composition which does not require special storage or handling procedures.

It is another object of the invention to present a urethane-producing powder coating composition which lends itself well to electrostatic coating techniques.

It is another object of the invention to present a urethane-producing powder coating composition which, when coated onto a substrate, forms an attractive, durable, high-gloss coating.

These and other objects of the invention will become apparent from the following description and examples.

DESCRIPTION OF THE INVENTION

The coating powder compositions of the present invention are comprised of one or more cyclic nitrile compounds having the structural formula

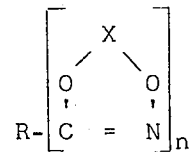

wherein X is a carbonyl, thionyl or oxalyl, $n$ is at least 2, and R is an organic radical free of reactive hydrogen groups. A reactive hydrogen-containing compound selected from the group consisting of organic polyols and organic polythiols and a condensation-rearrangement catalyst may optionally be incorporated into the coating powder compositions. The coating powder composition has a particle size of about 10 to 500 microns and preferably about 50 to 250 microns. According to a preferred embodiment, the cyclic nitrile compound is a cyclic nitrile carbonate and a reactive hydrogen group-containing compound, particularly an organic polyol, and a condensation-rearrangement catalyst are included in the formulation. A preferred polyol is cellulose acetate butyrate. In a modification of the above, a prepolymer is prepared by reacting a cyclic nitrile compound and a reactive hydrogen-containing compound and the prepolymer is combined with additional monomer to form a coating powder composition.

DEFINITIONS

The term polyurethane-type polymers is used herein to describe the polymeric compounds obtained when a cyclic nitrile compound reacts with a polyhydroxyl and/or polythiol-containing compound to produce a polyurethane, polythiourea or mixtures of these.

The term cyclic nitrile compound is used to describe compounds containing

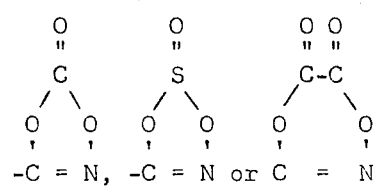

groups.

The term reactive hydrogen-containing compound is used to describe organic hydroxyl and/or thiol containing compounds. These have active hydrogen atoms as determined by the Zerewitinoff test, i.e., when they are added to a Grignard solution of methyl iodide, they liberate methane by decomposition of the Grignard reagent.

According to one embodiment of the invention, a cyclic nitrile compound may be used in the coating powder composition without a reactive hydrogen-containing compound. In this case, the cyclic nitrile compound cures, upon heating, to form a polyisocyanurate film having fine chemical and physical properties. Such a system would include the cyclic nitrile compound, pigments, and other desired ingredients. A catalyst may be included to promote the isocyanurate reaction but this is optional since heating alone will catalyze this reaction.

According to a second embodiment, the cyclic nitrile compound is combined with reactive hydrogen-containing compounds described below. In this embodiment, a catalyst may be added if desired. The ingredients may be combined and ground to the desired size or they may be separately ground and subsequently combined in the desired ratios. It is preferably to mix the ingredients and then grind them, as this procedure will provide a greater degree of mixing. It is important that the reactive components be substantially homogeneously dispersed in the composition so that the condensation-rearrangement reaction can proceed substantially to completion to produce a tough, continuous polymeric film of uniform molecular weight.

In accordance with a modification of the second-mentioned embodiment of the invention, a urethane prepolymer is prepared by reacting the cyclic nitrile compound with one or more of the reactive hydrogen-containing compounds described below under conditions such that a low molecular weight polyurethane-type polymer which is capable of further reaction is produced. This is accomplished by reacting one of the components with or without a catalyst with an excess of the other to produce urethane-type molecules terminated by groups of the component which is present in excess. The prepolymer can be then combined with an additional amount of the component which was in short supply in the prepolymer reaction and additional catalyst to form a stable urethane-type polymer-producing powder system. In this case, the prepolymer and other reactive component can also be combined before or after grinding. The preparation of prepolymers suitable for use in this embodiment of the invention is described in the aforementioned patents and is not a part of the invention.

THE CYCLIC NITRILE COMPOUNDS

The cyclic nitrile compounds used in the invention have the structure

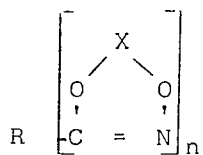

wherein X is carbonyl,

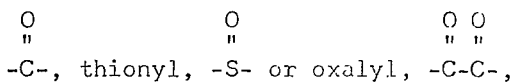

$n$ is at least 2 and R is an organic radical having from 2 to about 200,000 carbon atoms and is free of reactive hydrogens as determined by the Zerewitinoff test. Generally, R will consist essentially of carbon and hydrogen but there can be included therein other elements as well, as long as they do not materially affect the radical's basic characteristic of being non-interfering in condensation-rearrangement reactions between cyclic nitrile compounds and reactive hydrogen-containing compounds. Examples of such non-interfering groups are alkoxy, nitro, and halo groups. R can be saturated or ethylenically or acetylenically unsaturated, aliphatic radicals, saturated or ethylenically unsaturated cycloaliphatic radicals or aromatic radicals, including alkaryl, aralkyl, and fused ring aromatic radicals.

R often contains from 2 to 50 carbon atoms when it is aliphatic and from 6 to 30 carbon atoms when it is aromatic. When R has a content in this range, it preferably contains 2 to 12 carbon atoms when aliphatic and 6 to 18 carbon atoms when aromatic. R may also be of much higher molecular weight and may contain up to 200,000 or more carbon atoms. Cyclic nitrile compounds in which R has a high molecular weight may be prepared, for instance, by polymerizing unsaturated cyclic nitrile compounds, such as acrylonitrile carbonate. The preparation of cyclic nitrile compounds of this type is disclosed in U.S. Pat. No. 3,480,595, the disclosure of which is incorporated herein by reference.

The number of cyclic nitrile functional groups present in the cyclic nitrile compounds used in the invention is at least 2 and may vary to as high as 100,000 or more per molecule. Thus, $n$, in the above structural formula, is at least 2. In preparing high molecular weight polymers, it is usually desirable that $n$ be about 2. In the preferred embodiment of the invention, $n$ varies from 2 to about 6.

The preparation of the cyclic nitrile compounds useful in the invention forms no part of the invention, and one desiring to explore their preparation may refer to the above-mentioned patents and U.S. Pat. Nos. 3,507,900; 3,609,163; and 3,658,805, all of which are incorporated herein by reference.

Typical of the aliphatic cyclic nitrile compounds useful in the invention are:

1. Saturated aliphatic and cycloaliphatic compounds such as 1,2-ethane di(nitrile carbonate); 1,4-butane di(nitrile sulfite); 1,20-eicosane di(nitrile oxalate); 1,4-tetracontane di(nitrile carbonate); 5-ethyl-1,16-hexadicane di(nitrile carbonate); 1,3,5-pentane tri-(nitrile sulfite); 1,4,6,10-decane tetra(nitrile carbonate); 6-methyl-1,5,8-octane tri(nitrile oxalate); 1,4-cyclohexane di(nitrile carbonate); 2-ethyl-1,3,5-cyclohexane tri-(nitrile carbonate); etc.

2. Unsaturated aliphatic and cycloaliphatic compounds such as 1,2-ethene-di(nitrile carbonate); 1,4-butene-2-di(nitrile sulfite); 1,6,9-nonene-2-tri(nitrile oxalate); 3-propyl-1,5,7-heptene-2-tri(nitrile carbonate); 1,4-butyne-2-di(nitrile carbonate); 1,6-hexyne-2-di(nitrile carbonate); 1,4-cyclo-hexene-2-di(nitrile carbonate); etc.

3. Aromatic compounds such as benzene-1,3-di-(nitrile carbonate); benzene-1,4-di(nitrile sulfite; 1,4-dimethylbenzene-2,5-di(nitrile carbonate); and 1,3-diethylbenzene-2,4-di(nitrile oxalate); methylbenzene-di(nitrile carbonate); 1-benzylbenzene-2,4-di(nitrile carbonate); naphthalene-1,7-di(nitrile carbonate); 1,2-,3,4-tetrahydronaphthalene-di(nitrile carbonate); 2,2-diphenylpropane-p,p'-di(nitrile carbonate); diphenyl-methane-p,p'-di(nitrile carbonate); anthracene-2,8-di(nitrile carbonate); 1,2-dipehnylethane-p,p'-di(nitrile carbonate); biphenyl-di(nitrile carbonate);

1,2-diphenylethane-o,o'-di(nitrile oxalate); stilbene-p,p'-di(nitrile carbonate); and stilbene-o,o'-di-(nitrile sulfite).

Although cyclic nitrile sulfites and cyclic nitrile oxalates function as well as and sometimes better than cyclic nitrile carbonates, they are not as suitable as cyclic nitrile carbonates since the sulfites produce sulfur dioxide, an obnoxious and toxic gas, and the oxalates produce carbon monoxide, also a very toxic gas. Since the carbonates, upon reaction, release harmless and odorless carbon dioxide, these are much more suitable for general use. Thus, the preferred cyclic nitrile compounds are the saturated aliphatic cyclic nitrile carbonates in which R contains 2–12 carbon atoms such as 1,2-ethane di(nitrile carbonate); 1,4-butane di(nitrile carbonate); and 1,4,8-octane tri(nitrile carbonate).

THE ORGANIC POLYHYDROXYL AND POLYTHIOL COMPOUNDS

The organic polyhydroxyl compounds useful in the invention include aliphatic and aromatic polyols and polythiols, and polymers such as polyester polyols or polythiols, polyether polyols or polythiols, and polylactones, and similar compounds having from 2 to 6 or more, but preferably 3 or more, —OH or —SH groups or mixtures of these per molecule and having 2 to about 100,000 carbon atoms with hydroxyl numbers ranging from 12 to 1,100 or more. Mixtures of two or more of these compounds can also be employed.

The aliphatic and aromatic polyols and polythiols include, for example, ethylene glycol; diethylene glycol; thiodiethylene glycol; propylene glycol; 1,3-butylene glycol; 1,6-hexanediol; butenediol; butynediol; amylene glycols; 2-methyl-pentanediol-2,4; 1,7-heptanediol; glycerine; neopentyl glycol; trimethylol propane; pentaerythritol; cyclohexane dimethanol; sorbitol; mannitol; glactitol; talitol; xylitol; 1,2,5,6-tetrahydroxyhexane; styrene glycol; bis (βhydroxyethyl)-diphenyl-dimethylmethane; silanediols, e.g., triphenyl silanols, 1,4-dihydroxybenzene; etc., and the corresponding thiol-containing compounds.

The polyhydroxyl-containing or polythiol-containing polymeric compounds useful in this invention include, for instance, polyhydric polyalkylene ethers, polyhydroxyl polyesters, and hydroxyl group-containing, preferably hydroxyl-group terminated, polymers and the corresponding thiol-containing polymers. The polymers may contain noninterfering groups such as urethane linkages. The polyhydric or polythiol polyalkylene ethers may have a molecular weight greater than about 350 and may be derived, for example, by the polymerization of alkylene oxides such as ethylene oxide, propylene oxide, butylene oxide, and the like. Polyhydric polyalkylene ethers may also be prepared by the polymerization of the cyclic ethers such as, for example, dioxane, tetrahydrofuran, and the like, and by the condensation of an alkylene oxide with a glycol such as ethylene glycol, propylene glycol, butylene glycol, and the like.

The hydroxyl-containing and polythiol-containing polyesters may be obtained by the reaction of aliphatic or aromatic dicarboxylic acids with aliphatic or aromatic polyhydric alcohols or polythiol alcohols in the manner well known to the art in proportions that result in esters having at least two reactive hydroxy or mercaptan groups. Any polyols or polythioalcohols may be used to form the esters and thioesters and illustrative of such alcohols and thiols are those listed above in the discussion of suitable alcohols and thiols as the active hydrogen-containing reactant. Included within the suitable esters and thioesters are the hydroxyl-containing mono- and diglycerides of castor oil, tall oil, soya oil, linseed oil, etc. The latter esters and thioesters are usually prepolymers prepared by the reaction of the fatty glyceride with low molecular weight polyols or polythiol alcohols. Illustrative, for instance, of castor oil-based prepolymers are propylene glycol monoricinoleate, propylene glycol mono-12-hydroxystearate, neopentyl glycol monoricinoleate, dehydrated castor oil, ethylene glycol monoricinoleate, ethylene glycol mono-12-hydroxystearate, triglyceride or ricinoleic acid, epoxidized castor oil, and pentaerythitol tetraricinoleate and the corresponding thiol prepolymers. Other suitable hydroxy-containing polymers such as those derived from 1,4-butadiene; isoprene; 2,3-dimethylbutadiene; 2-chloro-1,3-butadiene; 2-cyano-1,3-butadiene; and other polymerizable ethylenically unsaturated monomers such as α-olefins of up to 12 carbon atoms such as ethylene, propylene, butene, etc.; styrene, acrylonitrile, acrylic acid or esters, methacrylic acid or esters, hydroxy alkyl acrylates or methacrylates, vinyl chloride, vinylidine chloride, and the like; hydroxyl-terminated condensates of phenol and lower aldehydes and hydroxy-terminated polyepoxides. A particularly suitable hydroxyl-containing compound is sytrene-vinyl alcohol copolymer, made by copolymerizing styrene and vinyl acetate and partially or fully hydrolyzing the acetate groups to alcohol groups.

The preferred compounds are the hydroxyl-containing polymers, particularly cellulose acetate butyrate and cellulose acetate propionate.

The functionality of the cyclic nitrile component and the organic polyols or polythiols is at least two. It is often desirable that the functionality of one or both of the reacting components be higher than two. In general, it is preferred that the cyclic nitrile compounds used have a functionality of two and the functionality of the organic polyols or polythiols be varied since it is much more economical to prepare polyfunctional hydroxyl and thiol compounds than polyfunctional cyclic nitrile compounds.

The ratio of cyclic nitrile compound to organic polyol or polythiol compounds may vary depending upon the desired properties of the coating compound being prepared and the functionality of the reacting materials. In general, it is desired to use amounts of cyclic nitrile compound and organic polyhydroxyl and/or polythiol compounds that will provide a ratio of cyclic nitrile functional group to total polyhydroxyl and polythiol groups of about 0.7 to 10:1 and preferably about 0.7 to 1.4:1. The same ratios apply when using a prepolymer and additional monomer in the coating powder composition, i.e., the ratio of the component having the reactive cyclic nitrile groups to the component having the reactive hydrogen-containing groups is desirably such that there are 0.7 to 10 and preferably 0.7 to 1.4 cyclic nitrile functional groups per each reactive hydrogen-containing group in the composition.

The condensation-rearrangement reaction between the cyclic nitrile compounds and the reactive hydrogen-containing compounds or between the prepolymer and additional monomer may be carried out by thermal initiation; however, it is usually preferred to add a catalyst to the formulation to facilitate reaction at lower temperatures and in shorter periods of time.

Suitable catalysts for the compositions of the invention are those generally found useful to catalyze the reaction between cyclic nitriles and reactive hydrogen-containing compounds. The following catalysts are typical of those which may be used in the compositions of the invention. The catalyst may be a basic material such as a teritiary amine having a pKa value greater than 3, e.g., triethylamine, as disclosed in U.S. Pat. No. 3,531,425, the disclosure of which is incorporated herein by reference. Another catalyst for use in accordance with the present invention is a combination of a first metal selected from Groups III through V of the Periodic System and a second metal selected from Groups I and III and the iron series of Group VIII of the Periodic System as disclosed In U.S. Pat. No. 3,652,507, which disclosure is incorporated herein by reference. Yet another useful catalyst in accordance with the present invention is set forth in U.S. Pat. No. 3,702,320 which disclosure is also incorporated herein by reference. In accordance with this particular patent, a compound of aluminum, tin, titanium, zinc, bismuth or iron is used in the reaction mixture. If the compound is one of aluminum, tin, titanium or bismuth, the reaction is run in the absence of metals of Groups I, II, and the iron series of Group VIII of the Periodic System. On the other hand, if the metal compound is a compound of zinc or iron, the reaction is run in the absence of metals of Groups III through V of the Periodic System. Other catalysts useful in the present invention are the organic and inorganic fluorides, as disclosed in copending U.S. Pat. Application Ser. No. 276,640, filed July 31, 1972 now U.S. Pat. No. 3,766,147 which is incorporated herein by reference. Still other catalysts useful in the present invention are the N-oxides of amines. The use of these catalysts is disclosed in copending U.S. Pat. Application Ser. No. 312,088, filed on Dec. 4, 1972 now U.S. Pat. No. 3,793,254 and the disclosure of this application is incorporated herein by reference. The preferred catalysts are the tertiary aliphatic, aromatic, and heterocyclic tertiary amines such as triethylene diamine, pyridine, N-ethyl morpholine, and N,N-dimethyl aniline. The catalyst, when present, is used at a concentration of about 0.001 to 10% and preferably about 0.01 to 2.0% based on the total weight of cyclic nitrile compound and reactive hydrogen-containing compound in the formulation.

In addition to the essential components, pigments, flow improvement agents and other property modifying materials may be included in the formulation. Thus, finely divided fillers such as carbon black, talcum, chipped glass fibers, etc.; collorants, surfactants such as silicone oils and emulsifiers, etc. may be added to the formulation. Similarly, other polymeric or monomeric materials, chain transfer agents, etc. may be added to the formulation to further modify the coating film.

The particle size of the coating powder compositions of the invention is such that most of the composition has a particle size range between about 10 to 500 microns and it is preferred that most of the composition be in the particle size range of about 50 to 250 microns. The various components of the coating powder composition may be ground separately or combined and ground together. Since heat initiates reaction between the cyclic nitrile groups and the polyol or polythiol groups, it is preferred to grind the ingredients of the powder formulation separately or under conditions such that excess heat is not produced. One particularly suitable method is freeze grinding in which the material is frozen before grinding to minimize the temperature rise of the mixture. There are many well known suitable methods for grinding coating materials to a size suitable for powder coating techniques and the method of size reduction of the coating powders used in this invention forms no part of the invention.

The powder compositions of the invention are particularly suitable for use in electrostatic powder spray or fluid bed systems because they are capable of holding a high electric charge and are easily comminuted.

In preparing the coating powder compositions of the invention, the cyclic nitrile carbonate and, if used, the reactive hydrogen-containing compound and catalyst as well as other desired additives are blended thoroughly in the proper proportions. As stated above, the various components may be pre-ground separately or the mixture of components may be ground. As previously stated, it is often desirable to combine the blending and grinding steps as this insures that a homogeneous mixture is obtained. The ground and blended coating composition is then ready for use or it may be stored for indefinite periods of time, preferably in moisture-proof containers at room temperatures.

To form coatings on the desired substrates, the coating powder compositions of the invention are applied by any of the known powder coating techniques including flock coating, rolling, fluidized bed, the various electrostatic methods, etc. The powder coating is transformed into a continuous durable coating by heating the coated part to a temperature of about 200° to 425°F. The coated part is maintained at this temperature until the desired degree of curing of the coating composition has occurred. The coated article is then cooled and ready for immediate use or further treatment, as desired.

The following examples illustrate preferred embodiments of the invention. Parts and percentages are expressed on a weight basis unless otherwise indicated.

EXAMPLE I 114 gms. (1 eq.) of ADNC adipodi(nitrile carbonate) is mechanically mixed with 41.3 gms. (1 eq.) of trimethylolpropane and 1.5 grams of solid triethylenediamine. The mixed powders are ground in a ball mill to a particle size of 50 microns or less. The finished formulation is applied to a uniform thickness by means of electrostatic spraying on a degreased mild steel panel surface, and then baked for 30 minutes at 180°C. The resulting clear films are tightly bonded, hard, and exhibit good impact resistance.

EXAMPLE II

A solid urethane prepolymer with terminal hydroxyl groups is prepared by reacting 2 moles of 2000 MW poly-(1,4-butanediol adipate) with 1 mole of methylene bis-(4 phenyl isocyanate), commonly called MDI. About 212 gms. of solid prepolymers are mixed with 11.4 grams of ADNC and 2 grams of solid triethylenediamine and ground to a uniform powder as in Example I above. Electrostatically sprayed coatings are baked for 30 minutes at 180°C. to yield clear, tough, and flexible coatings tightly bonded to steel panels.

EXAMPLE III

ADNC containing 1% by weight of dry powdered triethylenediamine is ground to a fine powder as in Example I above and then electrostatically sprayed onto degrease mild steel panels. Baking 30–45 minutes at 185°C. Yields a clear, hard, glossy finish.

Although the invention has been described by particular reference to specific examples, it is understood that the breadth of the invention is not limited thereto but only determined by the scope of the appended claims.

We claim:

1. A shelf-stable coating powder composition having a particle size range such that most of the particles have a size of about 10 to 500 microns comprised of
    A. 5 to 100 parts by weight of a cyclic nitrile compound having the structural formula

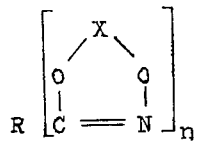

wherein X is

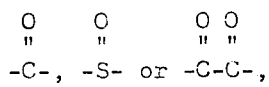

R is an organic radical free from reactive hydrogens as determined by the Zerewitinoff Test and $n$ is at least 2,
    B. 0 to 95 parts by weight of a reactive hydrogen-containing compound selected from the group consisting of organic polyols and organic polythiols, and mixtures of these,
    C. 0 to 10 parts per 100 total parts of (A) and (B) of a condensation-rearrangement catalyst.

2. The composition of claim 1 having a major particle size range of about 50 to 250 microns.

3. The composition of claim 2 wherein R is a hydrocarbon radical.

4. The composition of claim 3 wherein $n$ is 2 to 6.

5. The composition of claim 4 wherein X is

6. The composition of claim 5 wherein the cyclic nitrile compound is adipodi(nitrile carbonate).

7. The composition of claim 1 wherein said cyclic nitrile compound is present in an amount of about 10 to 90 parts and said reactive hydrogen-containing compound is present in an amount of about 90 to 10 parts per 100 parts of total cyclic nitrile compound and reactive hydrogen-containing compound.

8. The composition of claim 7 wherein the functional groups on the reactive hydrogen-containing compound are predominantly hydroxyl groups.

9. The composition of claim 7 wherein the reactive hydrogen-containing compound is styrene-vinyl alcohol copolymer.

10. The composition of claim 7 wherein the reactive hydrogen-containing compound is a polyester polyol or a polyether polyol.

11. The composition of claim 10 wherein said reactive hydrogen-containing compound has a molecular weight of up to 100,000.

12. The composition of claim 7 wherein the reactive hydrogen-containing group is cellulose acetate butyrate.

13. The composition of claim 12 wherein said catalyst includes an alkaline compound.

14. The composition of claim 7 wherein said catalyst is present in an amount of about 0.01 to 2 parts per 100 parts of (A) and (B).

15. The composition of claim 14 wherein the ratio of cyclic nitrile functional groups to total reactive hydrogen groups is about 0.7 to 10:1.

16. A shelf-stable coating powder composition having a particle size of about 50 to 250 microns comprised of
    A. 10 to 90 parts by weight of adipodi(nitrile carbonate),
    B. 90 to 10 parts by weight of cellulose acetate butyrate, and
    C. 0.1 to 2 parts per 100 parts of (A) and (B) of a condensation-rearrangement catalyst.

17. A shelf-stable coating powder composition having a particle size of about 50 to 250 microns comprised of a cyclic nitrile compound having the structural formula

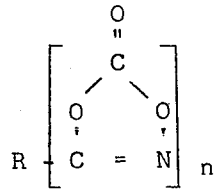

wherein R is a hydrocarbon radical containing 2 to 50 carbon atoms and $n$ is 2 to 6.

18. The composition of claim 17 wherein the cyclic nitrile compound is adipodi(nitrile carbonate).

19. A shelf-stable coating powder composition having a particle size of about 10 to 500 microns comprised of
    A. 0.5 to 2.5 equivalents of a cyclic nitrile group-terminated prepolymer prepared by the condensation-rearrangement reaction between
        1. A cyclic nitrile compound having the structural formula

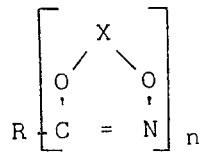

wherein X is

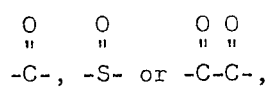

R is a hydrocarbon radical containing up to 200,000 carbon atoms and $n$ is at least 2, and 2. An organic compound containing at least 2 reactive hydrogen groups per molecule selected from the class consisting of hydroxyl radicals, mercapto radicals, and mixtures of these, the relative amounts of 1 and 2 being such that the ratio of cyclic nitrile groups to reactive hydrogen groups present in the reaction mixture is at least 2:1;

B. 0.5 to 2.5 equivalents of an organic compound containing at least 2 reactive hydrogen groups per molecule selected from the class consisting of hydroxyl radicals, mercapto radicals, and mixtures of these;

C. 0 to 10 parts per 100 parts by weight of (A) and (B) of a condensation-rearrangement catalyst.

20. The composition of claim 19 wherein (1) is adipodi(nitrile carbonate), (B) is a hydrocarbon polyol, and (C) is present in an amount of about 0.1 to 2 parts per 100 parts by weight of (A) and (B).

21. The composition of claim 19 wherein (A) is a reactive hydrogen group terminated prepolymer prepared by reacting (1) and (2) in relative amounts such that the ratio of reactive hydrogen groups to cyclic nitrile groups is at least 2:1, and (B) is the same as (1).

22. The composition of claim 21 wherein (1) and (B) are adipodi(nitrile carbonate).

\* \* \* \* \*